(12) United States Patent
Heartsill et al.

(10) Patent No.: US 7,185,381 B1
(45) Date of Patent: Mar. 6, 2007

(54) PET RAMP FOR TRUCKS

(76) Inventors: Harold D. Heartsill, 11714 Bellamy Brothers Blvd., Dade City, FL (US) 33525; Janet L. Heartsill, 11714 Bellamy Brothers Blvd., Dade City, FL (US) 33525

( * ) Notice: Subject to any disclaimer, the term of this patent is extended or adjusted under 35 U.S.C. 154(b) by 0 days.

(21) Appl. No.: 11/554,224

(22) Filed: Oct. 30, 2006

(51) Int. Cl.
*B65G 69/30* (2006.01)

(52) U.S. Cl. .................... 14/71.1; 14/69.5; 119/847; 119/849

(58) Field of Classification Search .............. 14/69.5, 14/71.1; 119/847, 849; 414/921; 193/38
See application file for complete search history.

(56) References Cited

U.S. PATENT DOCUMENTS

| | | | | |
|---|---|---|---|---|
| 426,209 | A | * | 4/1890 | McIntyre .................... 14/69.5 |
| 2,457,380 | A | * | 12/1948 | Kelberer ..................... 182/88 |
| 4,235,399 | A | * | 11/1980 | Shorey .................... 244/137.1 |
| 4,457,663 | A | * | 7/1984 | Hems et al. ................ 414/522 |
| 4,878,800 | A | * | 11/1989 | Dell .......................... 414/401 |
| 6,119,634 | A | | 9/2000 | Myrick |
| 6,267,082 | B1 | | 7/2001 | Naragon et al. |
| 6,536,064 | B1 | | 3/2003 | Swink et al. |
| 6,880,194 | B2 | * | 4/2005 | O'Donnell et al. .......... 14/69.5 |
| 6,968,810 | B2 | * | 11/2005 | Bishop ....................... 119/847 |
| 7,001,132 | B2 | * | 2/2006 | Koretsky et al. ........... 414/537 |
| 7,013,518 | B2 | * | 3/2006 | Leblanc ...................... 14/69.5 |
| 2005/0160539 | A1 | | 7/2005 | Schomaker et al. |

* cited by examiner

*Primary Examiner*—Gary S. Hartmann
(74) *Attorney, Agent, or Firm*—Larson & Larson, PA; Frank Liebenow

(57) ABSTRACT

A ramp for accessing a truck cab. A planar platform extends outwardly from the top step of the truck cab and has a straight edge that is substantially perpendicular to the axis of movement of the truck cab. A support member extends between the underside of the planar platform and the lower step of the truck cab. An inclined ramp is affixed to the straight edge of the planar platform and extends between the planar platform and the ground outwardly at an angle of less than 45 degrees from the axis of movement. The ramp and planar platform fold for easy storage outside the steps or inside the truck cab.

20 Claims, 6 Drawing Sheets

PET RAMP FOR TRUCKS

BACKGROUND OF THE INVENTION

1. Field of the Invention

This invention relates to the field of pet ramps and more particularly to a ramp for enabling a pet to climb into a cab of a tractor trailer.

2. Description of the Related Art

Truck drivers are often on the road for days or weeks, sometimes living in their truck cab. To combat loneliness, truck drivers often travel with their pets. Unfortunately, truck cabs are at a high elevation and the steps used for the truck driver are not often suitable for many pets with differing sizes and physical abilities. Furthermore, it may not always be feasible for the truck driver to lift the pet into the truck cab due to pet weight and the physical condition of the truck driver.

Ramps are well known and have been used for loading/ unloading trucks, train cars, etc. Many of such ramps consist of a simple inclined plane adapted between an elevated surface and a destination surface. Some ramps, as in rental trucks, pull out from beneath the truck bed where they are stored and lock in place between the truck bed and pavement to assist in loading and unloading. These ramps don't address access to the truck cab.

When not in use, there is a need to compactly and safely stow the ramp. Often, the truck cab is driven without a trailer. Therefore, the ramp must be stowed inside or outside of the truck cab.

Solutions to problems of a similar nature have been described in prior patents. For example, U.S. Pat. No. 6,267,082 to Naragon describes a portable dog ramp for attaching to the tailgate of a pickup truck. This ramp could be adapted for use on a tractor trailer cab but would extend outwardly, away from the cab, interfering with nearby objects such as other parked trucks or subjecting the pet to roadway dangers.

Another solution is presented in U.S. Pat. Application No. 2005/0160539 to Schomaker, et al, which is hereby incorporated by reference. This application describes a folding ramp for attaching to the tailgate of a pickup truck. This ramp could also be adapted for use on a tractor trailer cab but would likewise extend outwardly, away from the cab, interfering with nearby objects such as other parked trucks or subjecting the pet to roadway dangers.

What is needed is a ramp system that will extend predominately forward or backward from the top step of a truck cab enabling a living being to access the cab from the ground level, even when the truck cab is parked near a blocking object. The ramp needs to fold up for easy storage and transportation in or on the truck cab.

SUMMARY OF THE INVENTION

In one embodiment, a ramp for accessing a truck cab is disclosed. The truck cab has at least a top step and a lower step and an axis of movement. A planar platform extends outwardly from the top step of the truck cab and has a straight edge that is substantially perpendicular to the axis of movement of the truck cab. A support member extends between the underside of the planar platform and the lower step. An inclined ramp is affixed to the edge of the planar platform and extends between the planar platform and the ground outwardly at an angle of less than 45 degrees from the axis of movement.

In another embodiment, a ramp for accessing a truck cab is disclosed. The truck cab has at least a top step and a lower step and an axis of movement. A planar platform is affixed to the top step of the truck cab by hinges. The planar platform has a front edge that is substantially straight and perpendicular to the axis of movement of the truck cab. A support member extends between the underside of the planar platform and the lower step, thereby supporting the planar platform. An upper inclined ramp has a first edge affixed at to the front edge of the planar platform by hinges and extends forward with respect to the truck cab outwardly at an angle of less than 45 degrees from the axis of movement. A lower inclined ramp has a first edge affixed by hinges to a second edge of the upper inclined ramp distal from the first edge of the upper inclined ramp. The lower inclined ramp and upper inclined ramp are capable of extending between the planar platform and a ground surface.

In another embodiment, a ramp for accessing a truck cab is disclosed. The truck cab has at least a top step and a lower step and an axis of movement. The ramp includes a planar platform that extend outwardly from and is substantially level to the top surface of the top step of the truck cab. The planar platform has a front edge that is substantially straight and perpendicular to the axis of movement of the truck cab. A support member extends between an underside of the planar platform and the lower step, providing support to the planar platform. An inclined ramp is affixed to the front edge of the planar platform by hinges and can extend between the planar platform and the ground outwardly at an angle of from zero to 45 degrees with respect to the axis of movement.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
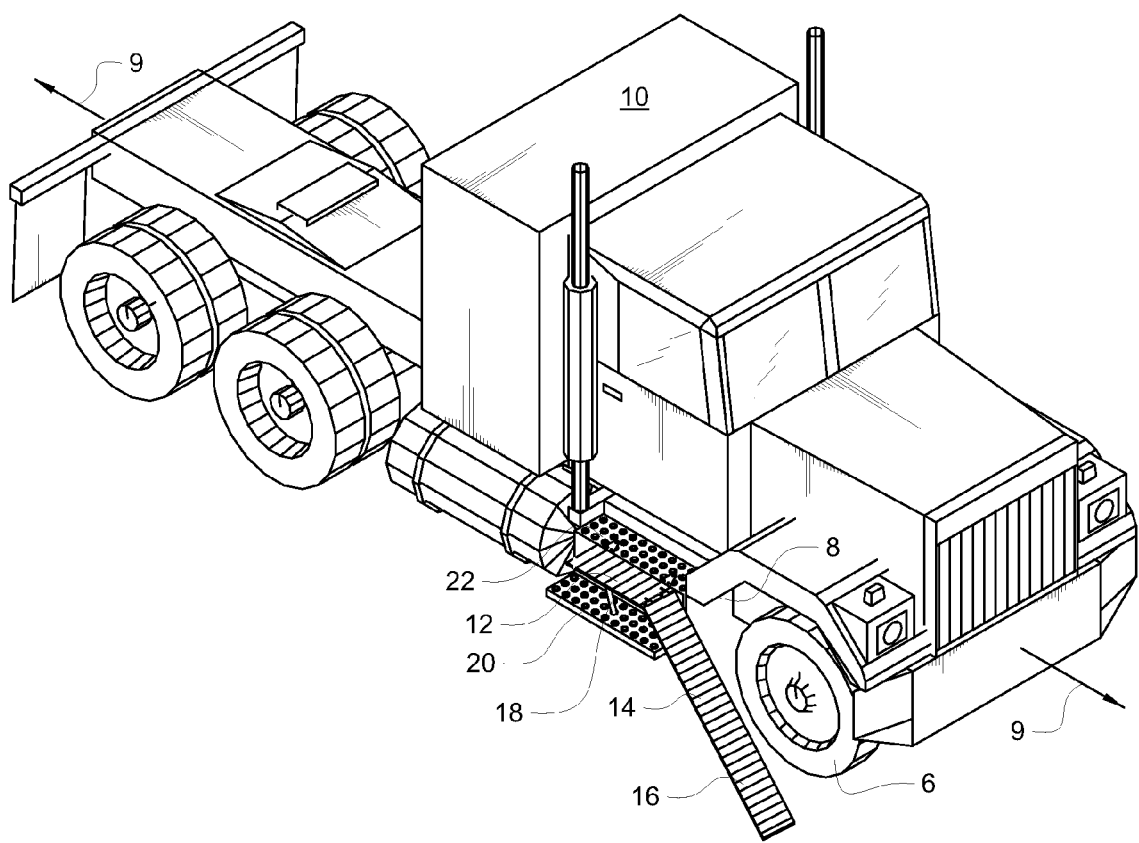
FIG. 1 illustrates a perspective view of a pet ramp of the present invention installed on a truck cab.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a pet ramp of the present invention installed on a truck cab will be described. Many truck cabs 10 have steps 20/22 that are difficult for small pets to climb. For example, a small or medium sized dog might easily get hurt trying to jump up these steps 20/22. The present invention provides a pet ramp that extends the surface area of the upper step 22 with a planar platform 12 while providing an inclined ramp 14/16 for the pet to walk from the surface level up to the top step 22. The truck cab 10 has an axis of movement 9 which is an imaginary straight line drawn in the normal direction of the truck cab 10. As can be seen, the inclined ramp 14/16 extends on a slight outward angle to the axis of movement 9, toward the front of the truck cab instead of outwardly at 90 degrees as in the prior art, providing easy and safer operation when used near roadways or in tight places when the truck cab 10 is parked near another truck or obstruction. The ramp can be angled outwardly at any angle from zero degrees to 45 degrees with respect to the axis of movement. It should be noted that, although the inclined ramp 14/16 is preferred to extend forward, it could be configured to extend backward at a similar angle. Details of the pet ramp, including the support member 18, will be shown in subsequent figures.

The planar platform 12 and inclined ramp 14/16 are made of a stiff, light-weight material such as aluminum or heavy-duty plastic. In some embodiments, the material is steel. In some embodiments, the material is steel which is honey-combed to provide support while reducing overall weight. It is preferred that the upper surface of the planar platform 12 and inclined ramp 14/16 be non-skid. In some embodiments, the top surfaces of the planar platform 12 and inclined ramp 14/16 are made non-skid by texturing or molding. In some embodiments, a commercially available, adhesive backed, non-skid material is applied to the upper surfaces of the planar platform 12 and inclined ramp 14/16. The non-skid surface provides traction for pets with wet feet.

Figure 2:
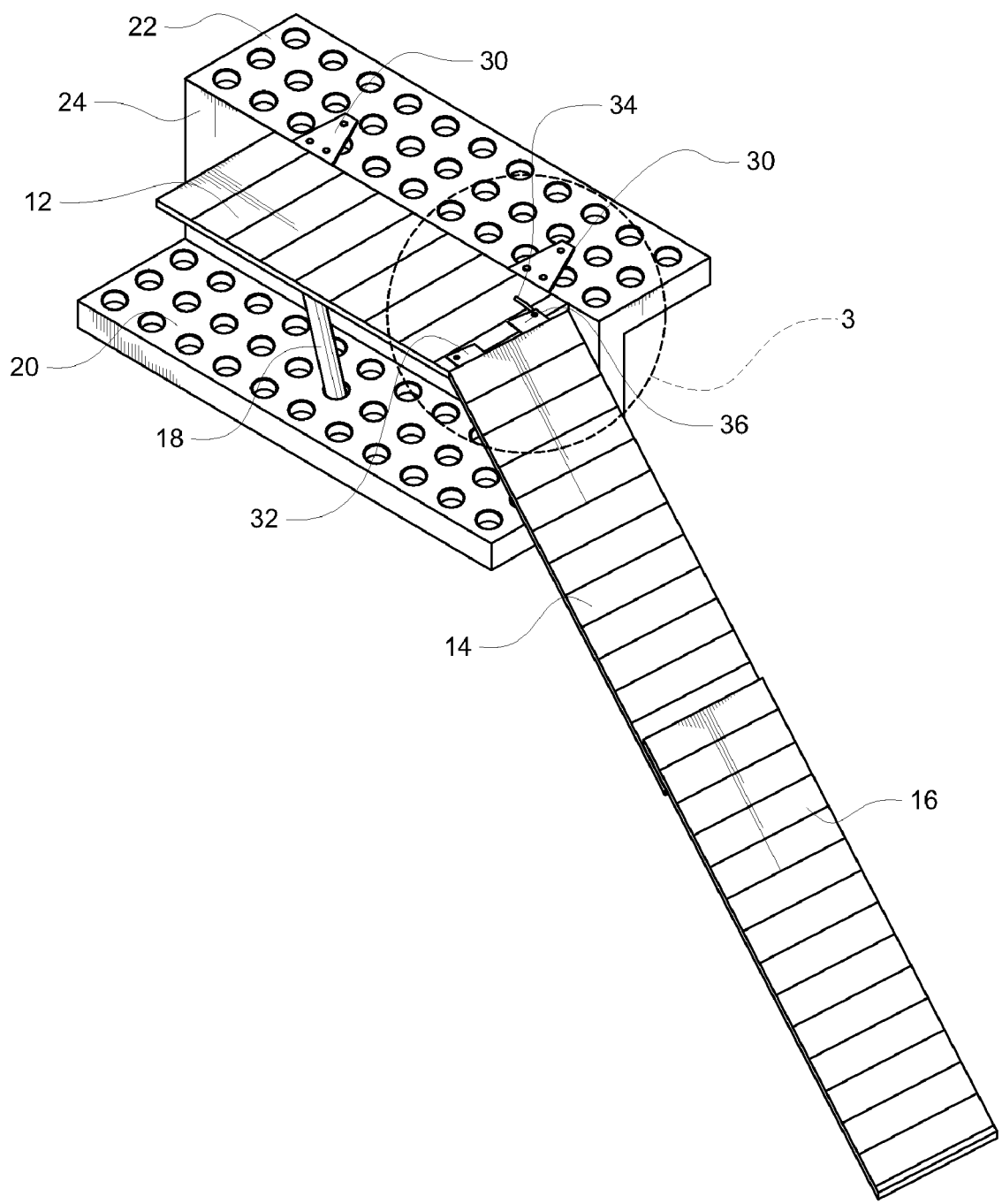
FIG. 2 illustrates a second perspective view of a pet ramp of the present invention.

Referring to FIG. 2, a second perspective view of a pet ramp of the present invention will be described. The upper 14 and lower 16 inclined ramps are connected by hinges (not visible in FIG. 2). The lower inclined ramp section 16 rests on the ground surface when extended. The upper inclined ramp section 14 is connected to the ramp platform 12 by hinges 32/36 at a forward facing edge or a backward facing edge that is substantially straight and substantially perpendicular to the axis of movement 9. The outer hinge 32 is pivotally interfaced to the ramp platform 12 while the inner hinge 36 is interfaced to the ramp platform 12 through a slot mechanism 34, allowing the inclined ramp 14/16 to be adjusted outwardly at an angle away from the truck wheel 6 and wheel well 8. The inclined ramp 14/16 can be adjusted to be parallel to the top step 22 or at an outward angle so that it clears the front tire 6 and wheel well 8. Details of this part of the pet ramp are shown in FIG. 3.

The planar ramp platform 12 is affixed to the top step 22 by hinges 30 so that it can be folded and rest against the step riser 24 when not in uses (shown in later figures). A support member 18 wedges between the planar ramp platform 12 and the bottom step 20, providing support when the pet is located on the ramp platform 12. Details of the connection between the support member 18 and the ramp platform 12 will be shown in subsequent figures.

Figure 3:
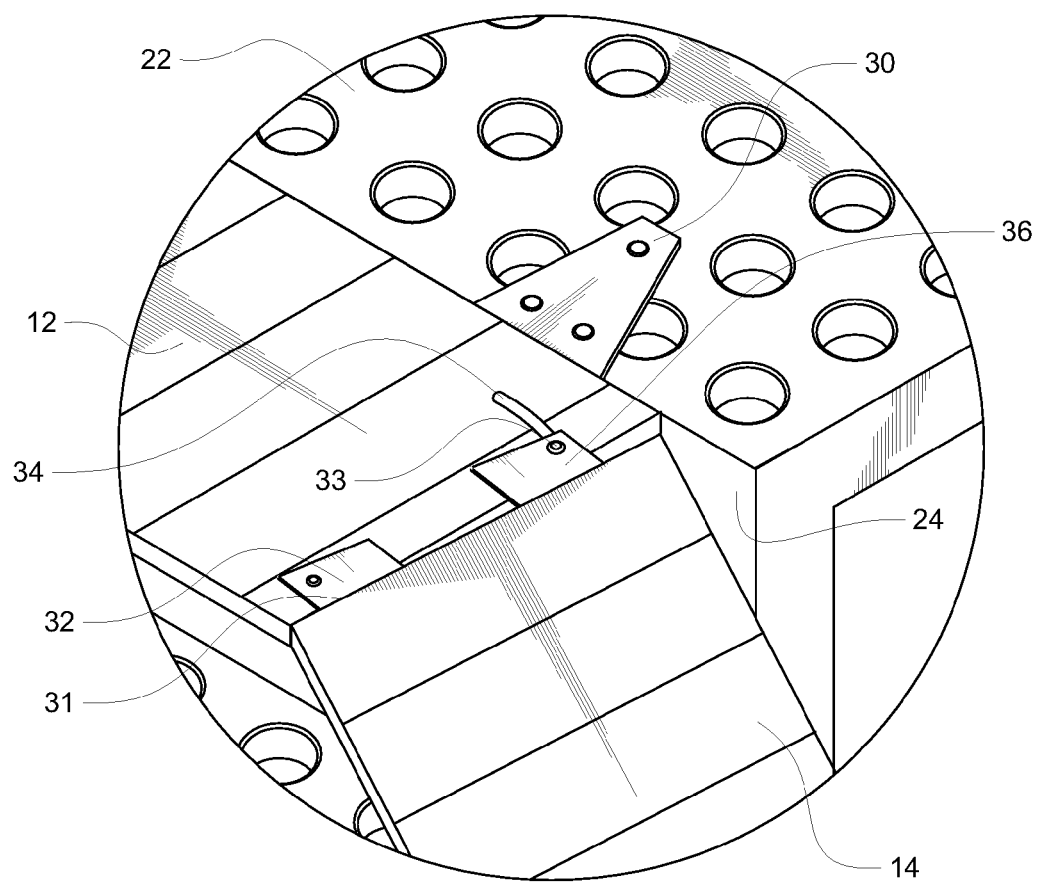
FIG. 3 illustrates an exploded view of the hinge area of the present invention.

Referring to FIG. 3, an exploded view of the hinge area 3 of the present invention will be described. The upper inclined ramp section 14 is connected to the ramp platform 12 by hinges 32/36. The inner and outer hinges 32/36 permit the inclined ramps 14/16 to be folded against the ramp platform 12 when not in use. The outer hinge 32 is pivotally interfaced to the ramp platform 12 by a fastener 31 while the inner hinge 36 is interfaced to the ramp platform 12 through a second fastener 33 and slot mechanism 34. The second fastener 33 moves freely in the slot 34, allowing the inclined ramp 14/16 to be adjusted outwardly from the truck cab 10. The inclined ramp 14/16 can be adjusted to be parallel to the top step 22 or at an outward angle so that it clears the front tire 6 or wheel well 8. It is preferred that the ramp be adjustable from zero to 45 degrees with respect to the axis of movement 9. The ramp platform is affixed to the top step 22 by hinges 30 so that it can be folded and rest against the step riser 24 when not in uses (shown in later figures).

Figure 4:
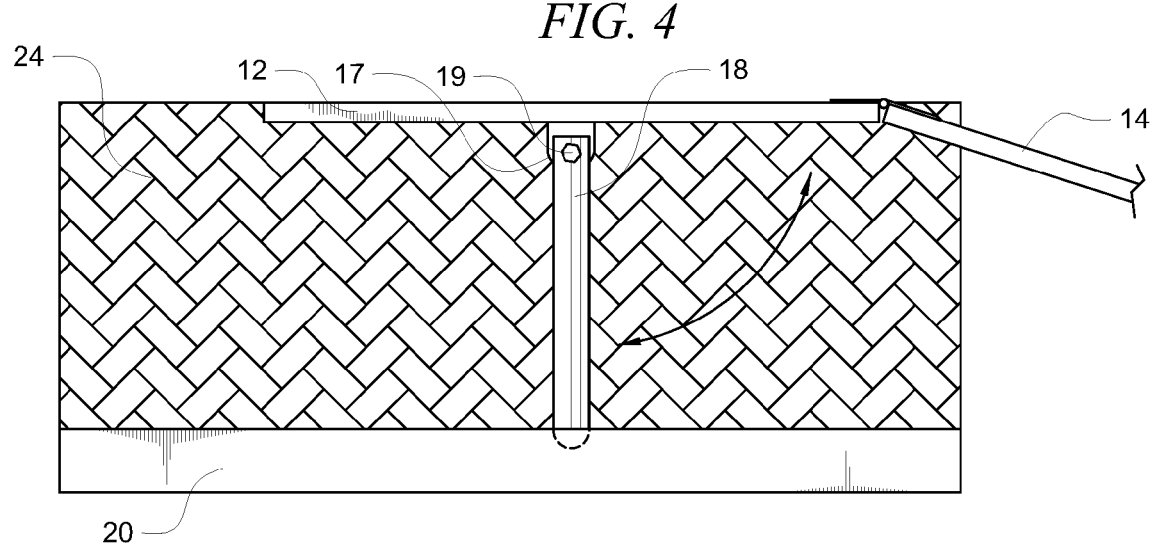
FIG. 4 illustrates a side view of the present invention.

Referring to FIG. 4, a side view of the present invention will be described. The hinge interface between the ramp planar platform 12 and the support 18 is shown. This hinge interface includes a bracket 17 and a hinge pin 19, allowing an approximately 90 degree rotation of the support 18, so it can be folded against the ramp platform 12 during storage. This is an exemplary hinge and any hinge capable of providing such swing to the support 18 is equally anticipated. Furthermore, in alternate embodiments, the support is removable instead of hinged.

Figure 5:
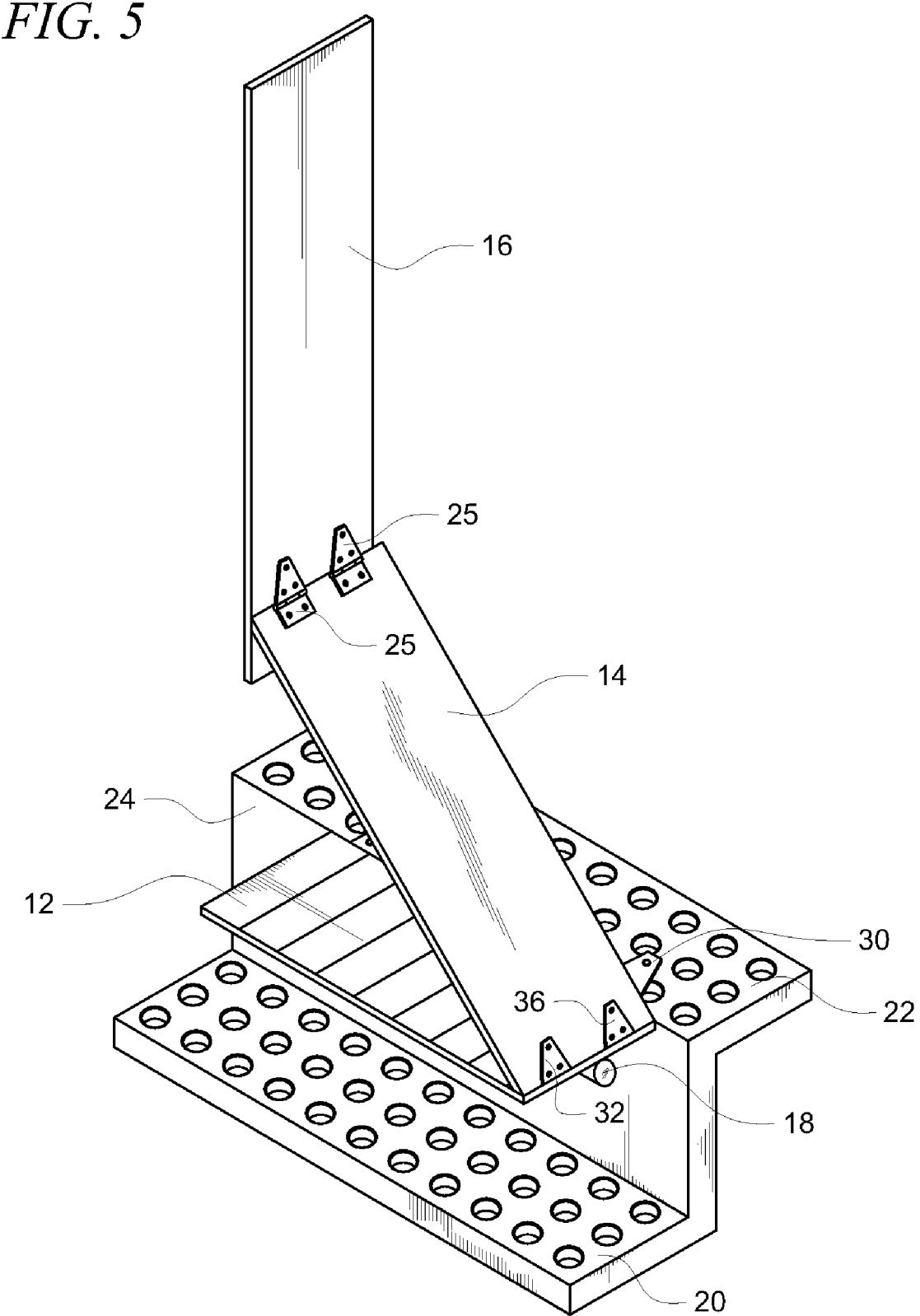
FIG. 5 illustrates a partial folded view of the present invention.
Figure 6:
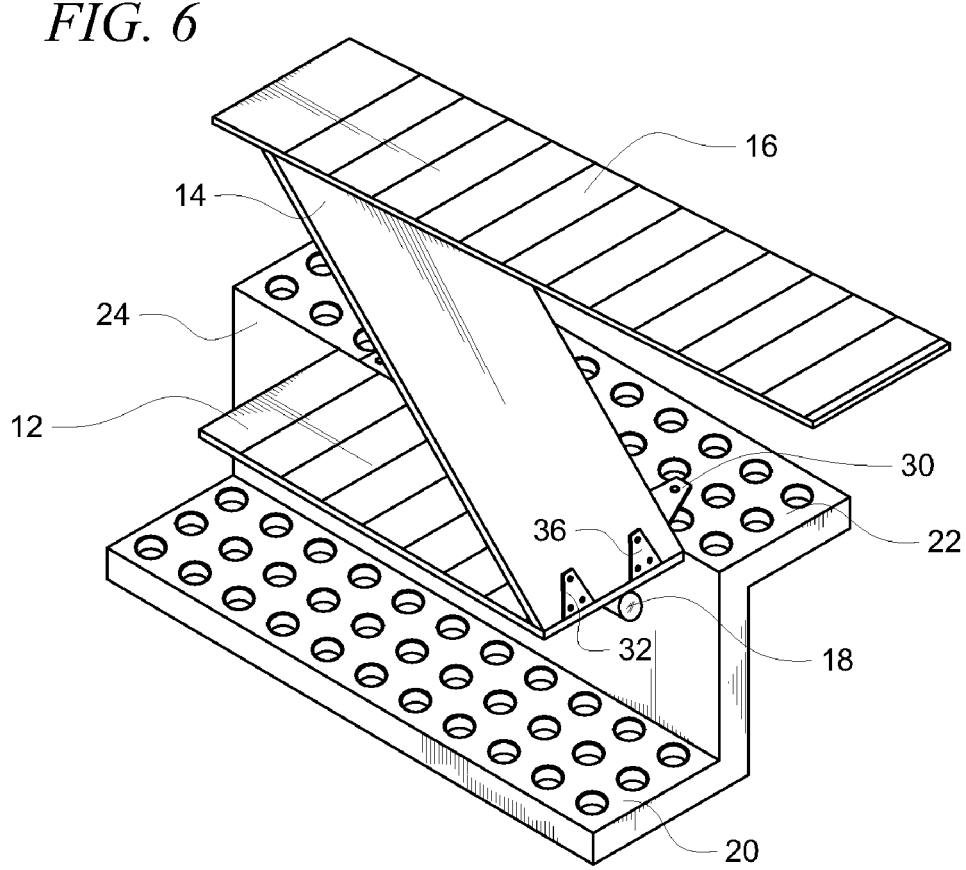
FIG. 6 illustrates a second partial folded view of the present invention.
Figure 7:
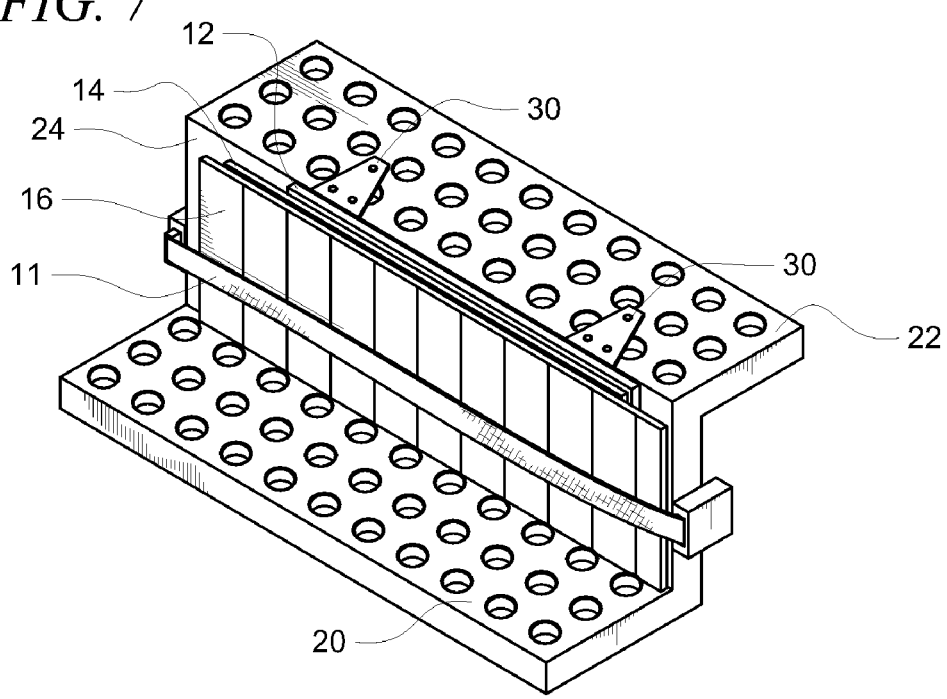
FIG. 7 illustrates a folded view of the present invention.

Referring to FIGS. 5 and 6, partial folded views of the ramp will be described. In these views, the support 18 is folded tightly against the ramp platform 12 and the upper inclined ramp 14 is partially folded towards the ramp platform 12 while the lower inclined ramp 16 is partially folded towards the upper inclined ramp 14. It can be seen that the lower inclined ramp 16 overlaps the upper inclined ramp 14, providing extra strength when the inclined ramp 14/16 is extended. The hinges 25 connecting the upper inclined ramp 14 to the lower inclined ramp 16 are visible in FIG. 5. In FIG. 7, the inclined ramps 14/16 are folded tightly against the ramp platform 12 and the entire assembly is folded along hinges 30 to rest against the step riser 24 between the lower step 20 and upper step 22. A strap 11 holds the pet ramp against the riser 24 while the truck cab 10 is being driven. Any type of strap or belt is envisioned. In alternate embodiments, snap clips or other types of clips are affixed to the riser 24 and interface with the pet ramp to hold the pet ramp securely and release it when needed.

Figure 8:
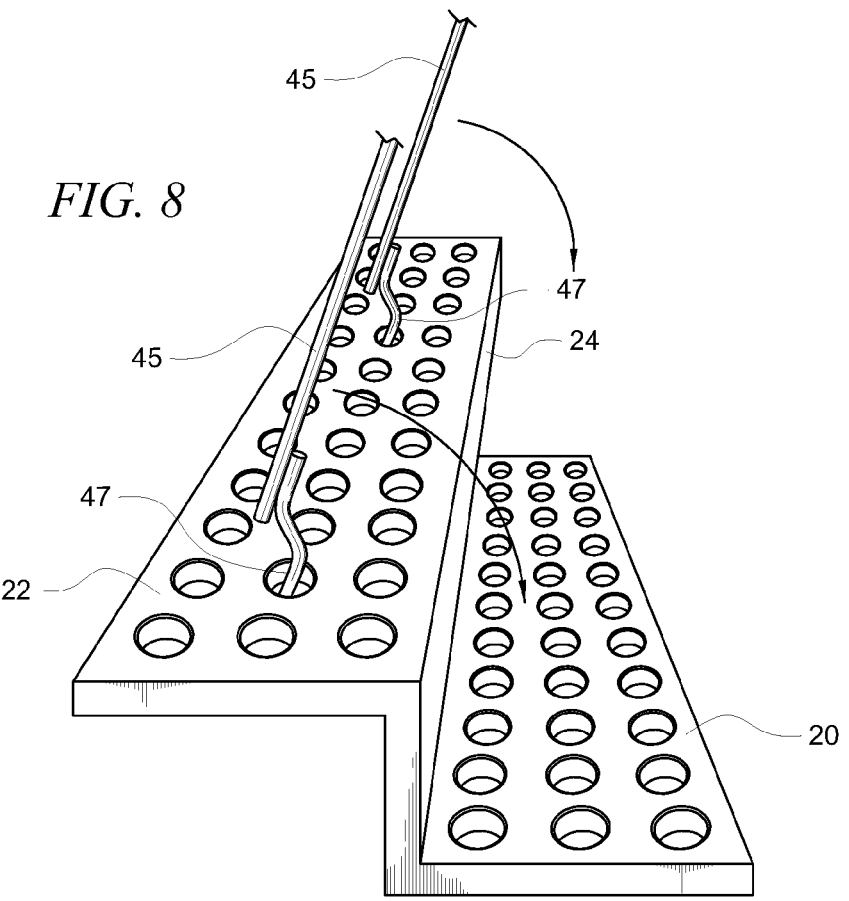
FIG. 8 illustrates a removable hinge of a second embodiment of the present invention.
Figure 9:
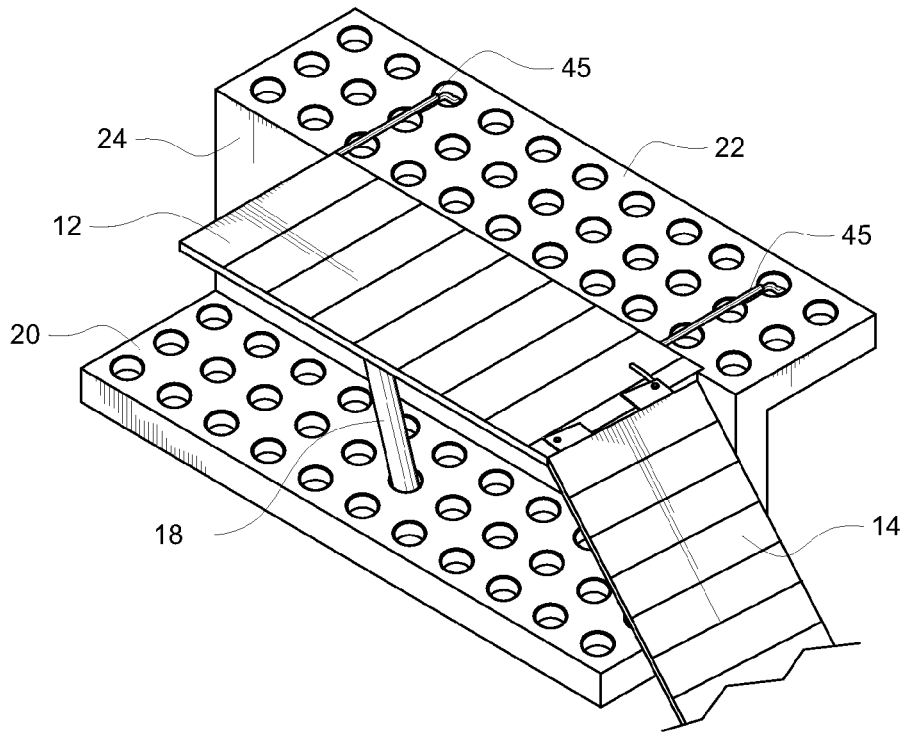
FIG. 9 illustrates a perspective view of the second embodiment of the present invention.

FIGS. 8 and 9 show an alternate embodiment of the present invention. In this embodiment, the pet ramp is removable and, when not in use, disengages from the truck step 22 through the use of support rods 45 with hooks 47 that secure the pet ramp into holes in the top step 22. This embodiment is useful for truck drivers who often change truck cabs. In FIG. 9, the removable embodiment is shown installed with the hooks 47 secured within the holes of the top step 22. It is preferred that, when installed, the support rods 45 lay as close to the surface of the top step 22 as possible.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A ramp for accessing a truck cab, the truck cab having at least a top step and a lower step and an axis of movement, the ramp comprising:
   a planar platform extending outwardly from the top step of the truck cab, the planar platform having an edge that is substantially straight and is substantially perpendicular to the axis of movement of the truck cab;
   a support member extending between an underside of the planar platform and the lower step, thereby supporting the planar platform; and
   an inclined ramp hingedly affixed to the edge of the planar platform and extendable between the planar platform and a ground surface at an angle of less than 45 degrees from the axis of movement.

2. The ramp of claim 1, wherein the planar platform is hingedly affixed to the top step.

3. The ramp of claim 1, wherein the planar platform is removably affixed to the top step.

4. The ramp of claim 1, wherein the support member is hingedly affixed to the underside of the planar platform, whereas the support member folds to lay substantially against the underside of the planar platform.

5. The ramp of claim 1, wherein the inclined ramp extends in a substantially forward direction with respect to the truck cab between the planar platform and the ground surface outwardly at an angle of less than 45 degrees with respect to the axis of movement.

6. The ramp of claim 1, wherein the inclined ramp comprises an upper inclined ramp connected to a lower inclined ramp by hinges.

7. The ramp of claim 6, wherein the upper inclined ramp overlaps the lower inclined ramp providing increased rigidity.

8. The ramp of claim 1, wherein a top surface of the inclined ramp and a top surface of the planar platform is covered with a non-skid material.

9. A ramp for accessing a truck cab, the truck cab having at least a top step and a lower step and an axis of movement, the ramp comprising:
   a planar platform hingedly affixed to the top step of the truck cab, the planar platform having a front edge that is substantially straight and is substantially perpendicular to the axis of movement of the truck cab;
   a support member extending between an underside of the planar platform and the lower step, thereby supporting the planar platform;
   an upper inclined ramp, a first edge of the upper inclined ramp hingedly affixed at to the front edge of the planar platform and extending forward with respect to the truck cab at an angle of less than 45 degrees from the axis of movement;
   a lower inclined ramp, a first edge of the lower inclined ramp hingedly affixed to a second edge of the upper inclined ramp distal from the first edge of the upper inclined ramp, the lower inclined ramp and upper inclined ramp capable of extending between the planar platform and a ground surface.

10. The ramp of claim 9, wherein the support member is hingedly affixed to the underside of the planar platform, whereas the support member is foldable to lay substantially against the underside of the planar platform.

11. The ramp of claim 9, wherein the upper inclined ramp overlaps the lower inclined ramp providing increased rigidity.

12. The ramp of claim 9, wherein the first edge of the upper inclined ramp is hingedly affixed at to the front edge of the planar platform by an outer and an inner hinge, the outer hinge pivotally attached to the front edge of the planar platform and the inner hinge attached to the front edge of the planar platform by a fastener, the fastener movably coupled to a slot in the planar platform, thereby allowing the upper inclined ramp to be adjusted at an angle of from 0 to 45 degrees with respect to the axis of movement.

13. The ramp of claim 9, wherein a top surface of the upper inclined ramp, a top surface of the lower inclined ramp and a top surface of the planar platform is covered with a non-skid material.

14. A ramp for accessing a truck cab, the truck cab having at least a top step and a lower step and an axis of movement, the ramp comprising:
   a planar platform extending outwardly from and being substantially level to a top surface of the top step of the truck cab, the planar platform having a front edge that is substantially straight and is substantially perpendicular to the axis of movement of the truck cab;
   a support member extending between an underside of the planar platform and the lower step, thereby supporting the planar platform; and
   an inclined ramp hingedly affixed to the front edge of the planar platform and adaptable to extend between the planar platform and a ground surface at an angle of from zero to 45 degrees with respect to the axis of movement.

15. The ramp of claim 14, wherein the planar platform is affixed to the top step by two or more hinges.

16. The ramp of claim 14, wherein the planar platform is removably affixed to the top step by two or more hooks that engage with an equal number of holes in the top surface of the top step of the truck cab.

17. The ramp of claim 14, wherein the support member is hingedly affixed to the underside of the planar platform and whereas the support member folds to lay substantially against the underside of the planar platform.

18. The ramp of claim 14, wherein the inclined ramp comprises an upper inclined ramp member connected to a lower inclined ramp member by at least one hinge.

19. The ramp of claim 18, wherein the upper inclined ramp member overlaps the lower inclined ramp member providing increased rigidity.

20. The ramp of claim 18, wherein a top surface of the upper inclined ramp member, a top surface of the lower inclined ramp member and a top surface of the planar platform is covered with a non-skid material.

* * * * *